US006775678B1

(12) United States Patent
Hillberg et al.

(10) Patent No.: US 6,775,678 B1
(45) Date of Patent: Aug. 10, 2004

(54) DATA STRUCTURE AND METHOD OF STORING A DIGITAL DOCUMENT

(75) Inventors: Michael J. Hillberg, Kirkland, WA (US); Chao-Chia Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/546,847

(22) Filed: Apr. 11, 2000

(51) Int. Cl.[7] .............................................. G06F 17/30
(52) U.S. Cl. .................... 707/102; 707/104.1; 715/523; 715/530
(58) Field of Search ......................... 707/1, 102, 104.1; 715/523, 530

(56) References Cited

U.S. PATENT DOCUMENTS 5,181,162 A * 1/1993 Smith et al. ................. 715/530
5,467,472 A * 11/1995 Williams et al. ............... 707/1
6,067,553 A * 5/2000 Downs et al. ............... 715/523

\* cited by examiner

*Primary Examiner*—Charles Rones
(74) *Attorney, Agent, or Firm*—Shook, Hardy & Bacon, L.L.P.

(57) ABSTRACT

A data structure is provided for storing a digital document to be rendered on a printer or viewer. The data structure includes a plurality of objects that define the content and layout of the document. The objects include at least one graphics object representative of a portion of at least one of the pages, a page object for each page, a document root object, a job object, and an index object. A canvas object can be provided which includes a list of graphics objects to be rendered on the associated page and the coordinates on the page at which each graphics object is located. Each page object includes a reference to the at least one graphics object, or a canvas object, for that page, and each document root object includes a list of the page objects for the document. The job object includes a list of all the document root objects for the documents to be rendered by the data structure, and the index object identifies the location of each of the objects in the data structure.

22 Claims, 7 Drawing Sheets

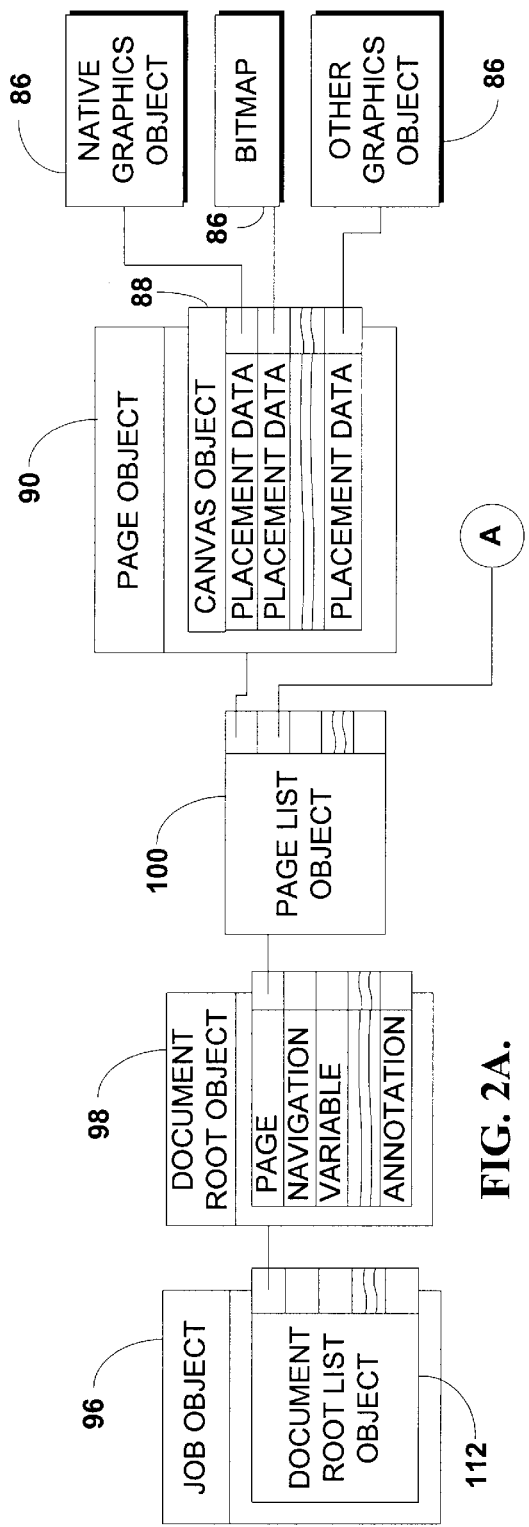
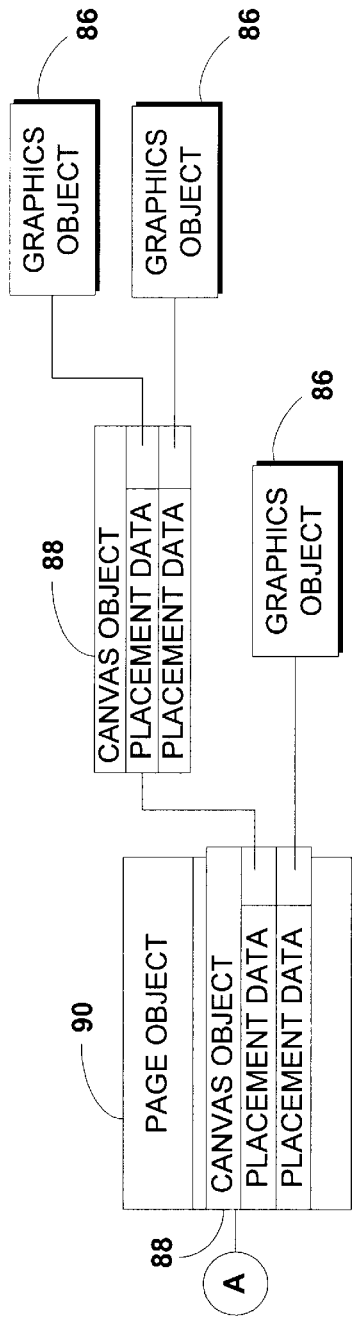
FIG. 2A.
FIG. 2B.

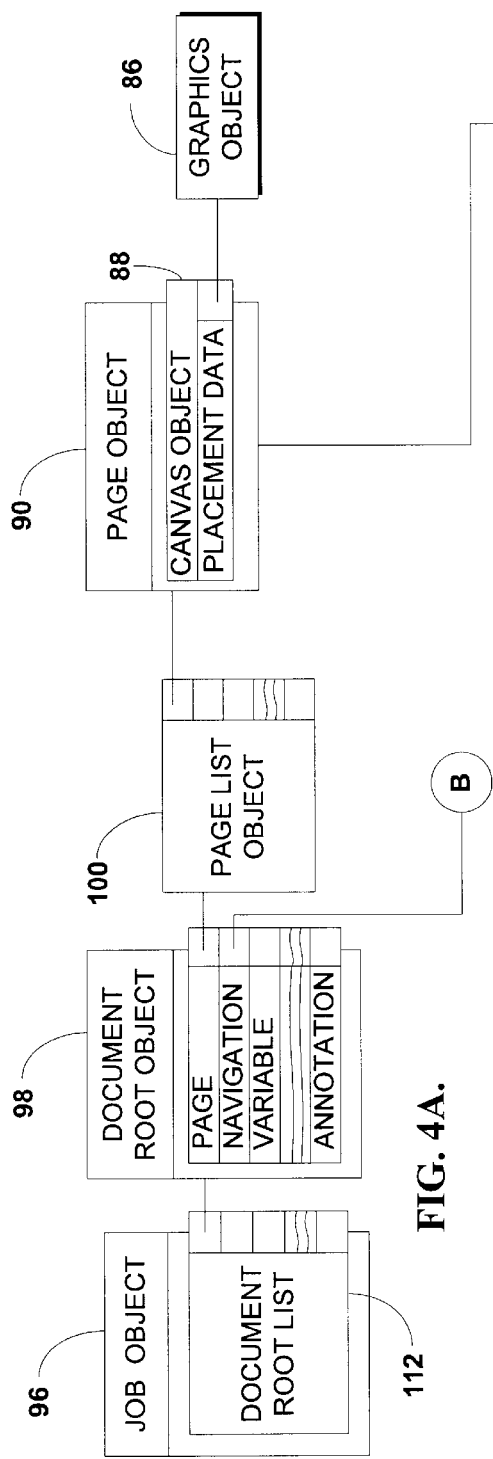
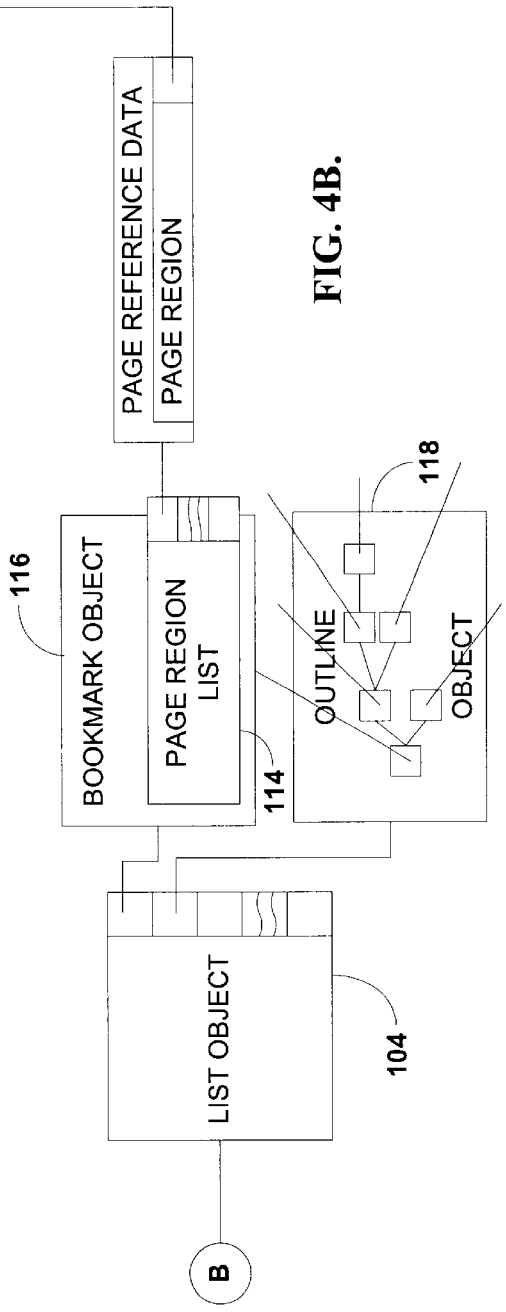
FIG. 4A.
FIG. 4B.

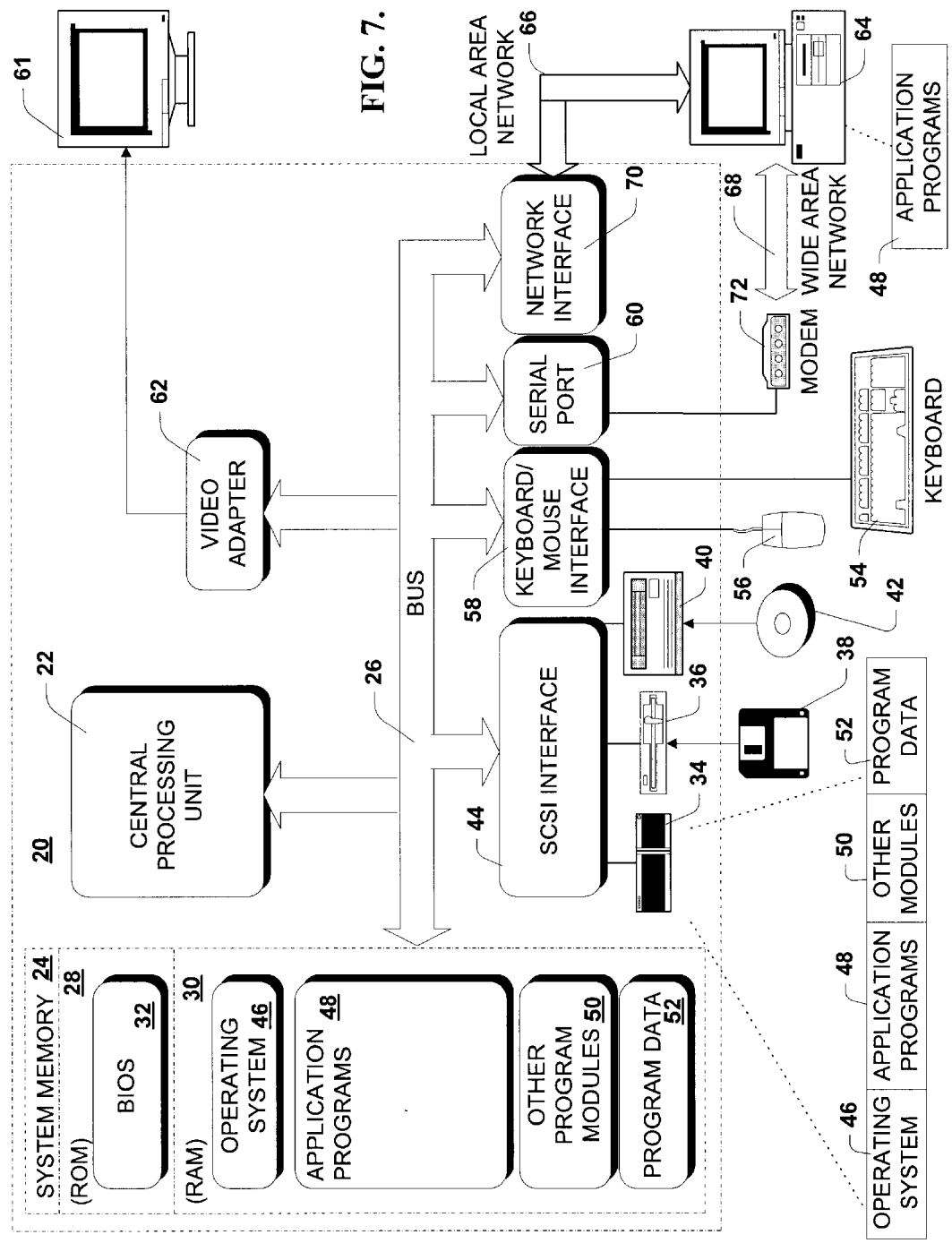

DATA STRUCTURE AND METHOD OF STORING A DIGITAL DOCUMENT

TECHNICAL FIELD

The present invention generally relates to the storage, retrieval and annotation of digital documents, and more particularly to a portable object-oriented data structure and method for storing a static digital document so that it can be rendered by a printer or viewer in a guaranteed layout, and so that it can store user annotations, navigational information, and the like.

BACKGROUND OF THE INVENTION

In a computing system having a graphical operating environment, an operating program interface typically includes a graphics display system having a library of graphics elements that provide the programmatic capability to draw to a surface. For example, in the WINDOWS® operating system, the graphics device interface (GDI) is used to draw to surfaces such as a display or printer. The graphics library incorporated in the operating system provides the capability to display text, circles, lines, squares, and many other graphics elements.

Conventionally, a series of graphical commands or resources from a graphics library can be recorded for later replay. For example, if an application calls a DrawCircle primitive command followed by a DrawRectangle primitive command, those two directives and their parameters can be recorded to a file, then later rendered. The format for storing GDI graphical commands in the WINDOWS® operating system is the extended metafile format (EMF). This known method and data structure permits the rendering of a page to be captured and stored electronically in graphics format, rather than in image format, such as a bitmap format or tagged image file format (TIFF). The captured commands can then be rendered to a printer, or displayed on a screen.

Although this known method and data structure provides a useful means of capturing a digital page for later replay, numerous limitations exist which restrict the use of the format. For example, because a single EMF file only holds one page, there is no simple means for capturing and storing an entire document or group of documents in a single EMF file. In addition, the format does not provide any means for associating the captured information with user annotations or navigational information such as hyperlinks.

In addition to the graphics display system employed in the operating system of a conventional graphical operating environment, known applications have been specifically developed for drawing graphics information to surfaces such as a display or printer. The graphics libraries incorporated in these applications differ from the graphical commands and resources native to the operating system, but seek to obtain the same goal of capturing and storing text, circles, lines, squares, and other graphics elements in a portable format for later display or printing.

An example of a known application used for rendering static graphical information is Adobe Systems' ACROBAT program, which converts a fully formatted document into a portable document format (PDF) file that can be viewed on several different platforms. The ACROBAT program uses a graphics library based on the POSTSCRIPT graphics language from Adobe Systems, and a viewer program is provided to view PDF files. Additional tools such as the DISTILLER, EXCHANGE, and PDF WRITER programs, all from Adobe Systems, are available for creating PDF files and for adding hyperlinks, annotations and other information to such files.

Although these known applications provide methods and data structures for capturing digital documents, certain drawbacks exist that prevent such systems from having universal application in various environments. For example, because the known systems incorporate special graphics libraries separate from the graphical commands and resources native to the operating system, special programs must be obtained to make, view and annotate documents to be rendered. In addition, if a portable format file is to be printed by a device that does not support the special graphics commands or resources, the operating system converts the digital document to include its native graphical commands, such as GDI graphical commands, for printing. Thus, even though the document has already been converted once into the portable file format, it must be converted again for printing. This can result in variations in the layout of the printed document.

Another problem encountered in the use of known document rendering systems arises when an attempt is made to render documents transmitted over the Internet or other network. Specifically, when a relatively large file is transmitted, the time required to receive the document can be significant. Because it may be necessary for the entire contents of the file to be received before the document can be displayed or printed, e.g., where random access of document data is not supported, a user must wait while the entire file is received. An attempted solution to this problem is to segment the file into two parts, one including the information necessary to render the first page or two of the document, and the rest including the remainder of the document. Thus, once the first part of the file is received, the first page or two can be displayed or printed. However, the user must still wait in order to view everything following the first page or two, which can be significant for long documents.

SUMMARY OF THE INVENTION

In accordance with various objects of the invention evident to a person of ordinary skill in the relevant art from the following description of the invention, a method is provided for storing a digital document. The method includes the steps of representing each page with at least one graphics object, creating a page object for each page that includes a reference to the at least one graphics object for that page, and creating a page list object including a list of references to the page objects for the document. The method further includes the step of creating a document root object that includes a reference to the page list object.

By providing a method in accordance with the present invention, several advantages are realized. For example, by practicing the inventive method, it is possible to capture and store a multiple page document, or a multiple document job, electronically in graphics format, enabling the document to be rendered to a screen or printer in a predictable and consistent layout that is device independent.

In accordance with one aspect of the invention, a computer-readable medium has stored thereon a data structure for storing a digital document having at least one page. The data structure includes at least one graphics object that represents all or a part of a page of the document. The data structure further includes a page object for each page of the document, wherein each page object includes a reference to the at least one graphics object for that page. A document root object is provided that includes a list of the page objects for the document, and a job object includes a list of all the document root objects for the documents to be rendered by the data structure. The data structure also includes an index object that identifies the location of each of the other objects in the data structure.

By creating each of these objects in the data structure for a document to be stored for subsequent rendering, numerous advantages result. For example, by providing an object-oriented data structure in which one of the objects is an index object referencing all the other objects, it is possible to store any object in the data structure in multiple, discontiguous segments. By allowing segmentable objects, a file can be streamed more effectively since unimportant bytes can be placed at the end of the file. Further, streaming is easier since any object can be appended to by appending the new bytes at the end of the file, rather than rearranging all the bytes of the file in order to keep the new and old bytes of the modified object contiguous.

BRIEF DESCRIPTION OF THE SEVERAL VIEWS OF THE DRAWING

A preferred embodiment of the present invention is described in detail below with reference to the attached drawing, wherein:

FIG. 2 is a block diagram of the data structure, illustrating various general objects forming a part thereof;

FIG. 4 is a block diagram of the data structure, illustrating various navigation objects forming a part thereof;

FIG. 7 is a schematic view of an exemplary operating environment in which the data structure and method of the present invention may be practiced.

DETAILED DESCRIPTION OF THE INVENTION

Figure 1:
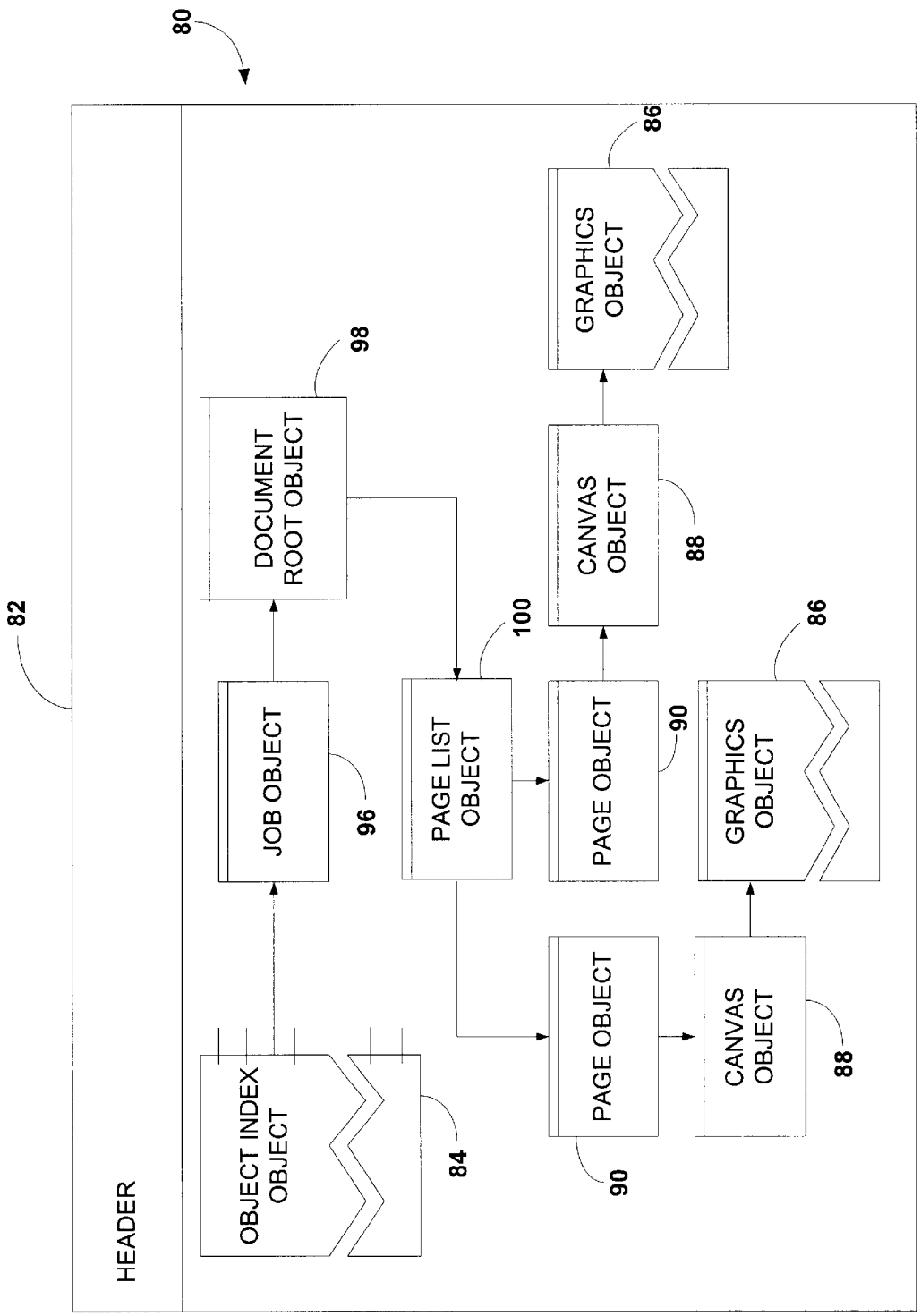
FIG. 1 is a schematic view of a data structure for storing at least one digital document on a computer-readable medium in accordance with the present invention.

The present invention provides a method and data structure for storing a static digital document so that it can be rendered by a printer or viewer in a guaranteed layout, and so that it can store user annotations, navigational information, and the like.

FIG. 7 illustrates an example of a suitable computing system environment on which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment program modules may be located in both local and remote computer storage media including memory storage devices.

With reference to FIG. 7, an exemplary system for implementing the invention includes a general purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, radio frequency (RF), infrared and other wireless media. Combinations of any of the above should also be included within the scope of computer readable media.

The system memory 24 includes computer storage media in the form of volatile and/or nonvolatile memory such as read only memory (ROM) 28 and random access memory (RAM) 30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 7 illustrates operating system 46, application programs 48, other program modules 50, and program data 52.

The computer 20 may also include other removable/non-removable, volatile/nonvolatile computer storage media. By way of example only, FIG. 7 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, nonvolatile optical disk 42 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like.

The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 7, provide storage of computer readable instructions, data structures, program modules and other data for the computer 20. In FIG. 7, for example, hard disk drive 34 is illustrated as storing operating system 46, application programs 48, other program modules 50, and program data 52. Note that these components can either be the same as or different from operating system 46, application programs 48, other program modules 50, and program data 52.

A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB).

A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64. The remote computer 64 may be a personal computer, a server, a router, a network PC, a peer device or other common network node, and typically includes many or all of the elements described above relative to the computer 20, although only a memory storage device has been illustrated in FIG. 7. The logical connections depicted in FIG. 7 include a local area network (LAN) 66 and a wide area network (WAN) 68, but may also include other networks. Such networking environments are commonplace in offices, enterprise-wide computer networks, intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 7 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 48 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

Figure 8:
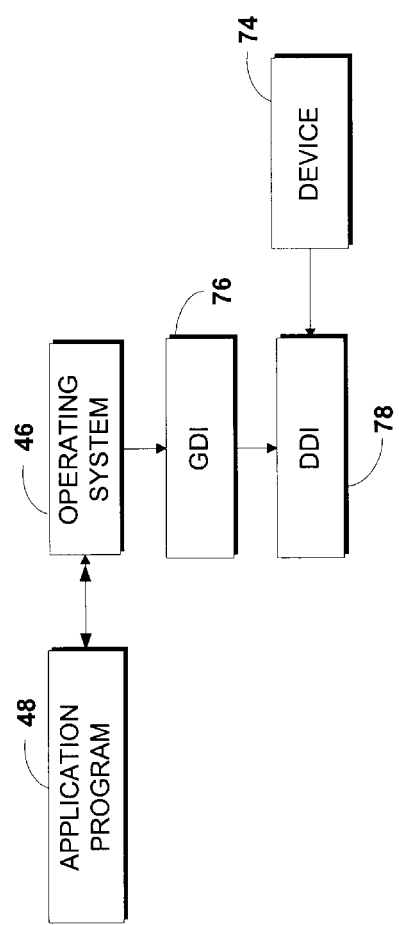
FIG. 8 is a block diagram of the exemplary operating environment.

FIG. 8 illustrates the interaction between a device 74, such as a display or a printer, the operating system 46 and an application program 48. Referring now to FIGS. 7 and 8, the operating system 46 is loaded into RAM 30 when the computer 20 is turned on or reset. The operating system 46 provides the basic interface between the computer's resources, the user and the application program 48. The operating system 46 interprets and carries out instructions issued by the user. For example, when the user wants to load an application program 48, the operating system 46 interprets the instruction and causes the processing unit 22 to load the program from the hard disk drive 34 into the RAM 30. Once the application program 48 is loaded into RAM 30, it is executed by the processing unit 22. In the case of large programs, the processing unit 22 loads various portions of the program 48 into RAM 30 as needed.

The operating system 46 also provides a variety of functions or services that allow application program 48 to deal with various types of input/output (I/O). This allows an application program 48 to issue simple function calls that cause the operating system 46 to perform the steps required to accomplish the tasks, such as displaying a document on the monitor 61 or printing it.

With continued reference to FIG. 8, the application program 48 communicates with the operating system 46 by calling predefined function calls provided by the operating system 46. The operating system 46 responds by providing the requested information or executing the requested task. Typically, the operating system includes a graphical device interface (GDI) 76 to draw to surfaces such as the display or printer. The GDI is used by applications to display or print bitmapped text, images, and other graphical elements, and renders elements by calling the appropriate screen or printer drivers and passing them the information on the element to be drawn. It does not reformat the image or document in PostScript or another printer language. The device driver interface (DDI) 78 is a software component that permits the computer system to communicate with a device, such as the display or printer 74. The driver 78 also manipulates the hardware in order to transmit the data to the device.

A physical model of a single file 80 incorporating a data structure in accordance with the present invention is shown in FIG. 1, and broadly represents a container for storing graphics commands representative of a static digital document so that the document can be rendered by a printer or viewer in a guaranteed layout, and for storing user annotations, navigational information, and the like. The exemplary file includes a header 82, and contains a plurality of objects. The header appears in the initial bytes of the file byte stream in a binary format of the invention, and includes an identification of the job represented by the objects included in the file, and a pointer to an object index object 84 included in the file. By providing an identification of the job, the file can be identified regardless of its location. By referencing the location of the object index object, the location of all the objects in the file can be found.

A plurality of different types of objects can be created and included in the data structure of the present invention. Broadly, among the types of objects that can be incorporated in a file are graphics objects 86, canvas objects 88, page objects 90, indirection objects 92, and document variable objects 94, all of which relate to the graphical commands to be rendered in a single page of a document. In addition, the data structure can include job, document root, and page list objects 96, 98, 100, which permit multiple pages to be grouped, other list objects and property set objects, and annotational objects such as user annotation objects and navigation objects, all of which are described herein. Other types of objects may also be included without departing from the scope of the invention as recited in the claims. Various types of objects are described below with reference to the physical model of FIG. 1, and the logical models represented collectively by FIGS. 2–6.

With initial reference to FIG. 1, each object, regardless of type, includes a header that appears among the initial bytes of the object byte stream in a binary format of the invention. The header of each object includes various types of information that will be described with reference to each particular type of object. Among the objects illustrated in the physical model of the data structure are the object index object 84, job object 96, document root object 98, a page list object 100, a pair of page objects 90, a pair of canvas objects 88, and a pair of graphics objects 86.

Preferably, the data structure of the present invention is agnostic to the particular graphics model or format used in representing a page or document to be rendered, and each graphics object included in the data structure is seen simply as an opaque blob of data that is executed by the graphics library of a suitable computing system with which the data structure is used. Preferably, the native graphics format includes the available graphics commands and resources present in the graphics library of the operating system. The graphics library provides the capability to display text, circles, lines, squares, and many other graphics elements.

Any other graphics command or resource can also be incorporated in a graphics object. For example, in an embodiment implemented with the WINDOWS® operating system, application specific data can also be stored in special objects by identifying a preferred handler for the data included in the object and a multipurpose Internet mail extension (MIME) ContentType value identifying the data type. If the preferred handler cannot be found, the ContentType is used to infer the appropriate installed handler. Finally, an interface ID (ID) is provided that indicates how the data was serialized into the object, e.g., an Ipersist interface.

A canvas object 88 is representative of a portion of a page onto which associated graphics objects are to be rendered. The canvas object includes a reference to each graphics object to be rendered on that canvas, and the coordinates at which each graphics object should be drawn relative to the canvas or page. Alternately, a canvas object can reference another canvas object, as illustrated in FIGS. 2A and 2B. In a simple example of the present invention, shown in FIG. 1, each canvas object 88 references a single graphics object 86 that includes a native graphics command or resource occupying an entire page of a document. However, the extent of use of canvas objects is not so limited, as evidenced from the various other examples provided herein.

The order in which graphics objects appear in a canvas object can be used to imply the Z-order with which they are drawn. For example, elements that appear later in the canvas object can be considered higher in the Z order. Alternately, explicit specification of the Z order could be provided. In addition, each graphics object referenced by a canvas object preferably includes a pair of rectangles that define how the graphics object is stretched and/or cropped to the page region defined by the canvas object.

Each page object 90 of the data structure is representative of a single page of a document to be rendered. The page object can a reference the canvas object(s) 88 associated with the page, and also to an indirection object or to a list object of annotations or the like, examples of which are described below. Moreover, to the extent a canvas object 88 would only reference a single graphics object 86 using default coordinates, the page object may reference the graphics object directly.

The locations in the data structure of all of the page objects of a document are listed in the page list object 100, and the page list object is referenced by the document root object 98. The page list object could also be referred to as a page structure object or page tree object, and all of the names used herein to describe the various objects of the data structure of the present invention are provided simply to facilitate an understanding of the data structure and method of the present invention, and are not intended to limit the scope of the invention in any way.

Figure 3:
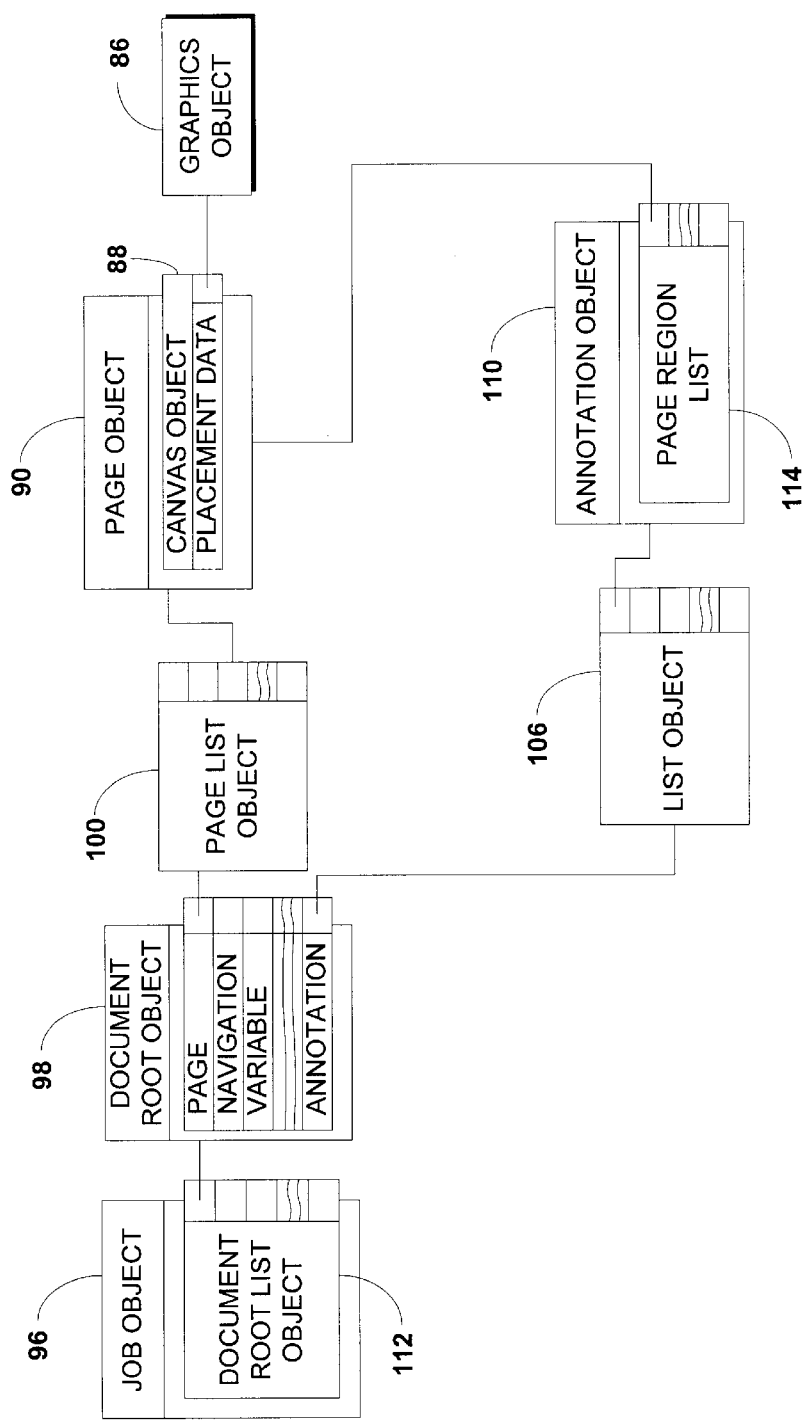
FIG. 3 is a block diagram of the data structure, illustrating various annotation objects forming a part thereof.

There is a single document root object for each document included in a job, and it includes references to the page list object 100 as well as to other list objects such as a document variable list object 102 (FIG. 5), a list object 104 of navigation objects (FIG. 4B), and a list object 106 of annotation objects (FIG. 3). Each of these list objects list the location in the data structure of the document variable objects 94, navigation objects and annotation objects 110 that are used to render the document. Any number of objects can be listed in any given list object, and any desired number of list objects can be used to organize any particular object type. The document root object may also reference a list of name table objects. For example, a page name table object includes friendly names for each page of the document and an ID of each page object. Likewise, a bookmark name table object includes a list of unique bookmark names and for each name the bookmark object's identifier.

One job object 96 is provided in the data structure for each job to be rendered, wherein a job is defined as one or more documents each consisting of one or more pages. The concept of the job object is to bind together multiple documents that are to be rendered together so that the property sets and other resources used by the documents can be shared. Preferably, the job object of the data structure maintains a list of IDs for the document root objects 98 to be included in the job, wherein each ID is a reference to the location of the document root object.

With reference to FIG. 2A, a single job object 96 references a document root list object 112 listing the document root objects. A page list object 100 is referenced by the document root object, and it in turn references two page objects 90. The upper page object in FIG. 2A, references a single canvas object 88 that identifies the locations of three graphics objects 86 and the coordinates on the page at which the objects 86 are to be rendered. One of the graphics objects is a native object, e.g., a GDI command or resource, while the remaining graphics objects are foreign, e.g., a bitmap image and an application-specific graphics command or resource.

The lower page object 90 in FIG. 2B, references a first canvas object 88 that, in turn, identifies the location of a second canvas object and the coordinates on the page at which the second canvas object is located on the page. In addition, the first canvas object identifies the location of a graphics object 86 and the coordinates on the first canvas at which the object is to be rendered. The second canvas object identifies the location of a graphics object 86 and the coordinates on the second canvas at which the object is to be rendered.

Although numerous list objects are identified herein, other types of list objects may also be provided. In each case, the list object includes an array of references to other objects. In addition, a list object may include a special property such as a globally unique identifier (QUID) that provides some context to the list.

Property sets are also stored in the data structure as objects, e.g., in the object linking and embedding (OLE) property set serialization format. A property set object can be associated with any other object(s) in the data structure by maintaining a reference to the property set object in the header of the associated object. The header of the object referencing the property set object maintains a reference to an array of name/value pairs, wherein the name identifies the property set object, and the value provides the property set object's location in the data structure. The array itself may be stored in the data structure as an object. Alternately, some of the property sets to be used in rendering a document, such as native property sets, may be stored inline with an object header.

Turning to FIG. 3, an annotation object 110 is illustrated as being associated with a page object 90 of a document in a job. The data structure in the figure includes a job object 96 that references a document root list object 112 listing the document root object 98. A page list object 100 is referenced by the document root object 98, and it in turn references a page object 90. The page object references a single canvas object 88 that identifies the location of a single graphics object 86 and the coordinates on the page at which the object is to be rendered. By way of example, an annotation object references the page object with the purpose of displaying annotation relating to the graphics object information with the page so that a user can review the annotations while viewing the page. Thus, although the annotation is not intended to be a part of or to modify the digital document being rendered, it is to be displayed in such a way as to provide an indication of the location in the document to which the annotation is directed.

In a preferred embodiment of the invention, annotation objects are generated by an application that is aware of the format of the data structure. Annotation objects can be associated with any other object, e.g., a page or graphics object, from that object's property set objects, and can include a reference to a page region list object 114 that includes the coordinates on the referenced page or graphics object at which the annotation is to be displayed or that a graphics handler for the annotation object can otherwise interpret. Preferably, the coordinates on the annotations are relative to the object to which they are attached. Exemplary types of annotations include comments, discussion trees, bookmarks, document outlines, hyperlinks, highlights, scribbles, tool-tips, thumbnails, and any other data type for which a handler is provided. Annotations are preferably associated with a page object or graphics object in creation order, which implies the Z order, so that recently created annotations can be drawn on top of earlier ones, or vice versa.

In a first embodiment, and as illustrated in FIG. 3, the document root object 98 references a list object 106 that contains references to one or more annotated objects 110. Preferably, the list object would be selectively organized to contain references solely to a single type of annotation object, such as a comment annotation object. Alternatively, some annotation objects, such as hyperlink objects, may be referenced directly from the document root object 98.

As illustrated in FIG. 4B, other types of annotation objects that can be employed in the data structure of the present invention include navigation objects such as bookmark objects 116 and outline objects 118. A bookmark is a reference to one or more pages of a document, or to a specific point or region on a single page. Typically, a user selects a bookmark to find a particular point in the document, and the marked page is subsequently rendered with the marked language highlighted.

A bookmark object 116 includes a page region list 114 having one or more page region entries. Preferably, a page region entry directly references an object, such as the page object or graphics object. Additionally, in terms of page or graphics objects, the coordinate specification and/or the custom data is stored on the page/graphics object.

In an alternative embodiment, the page region list 114 references entry numbers for a global page region table. A page region entry in the page region list 114 defines a region of a page and/or the graphics object on that page, and page reference data including either a coordinate specification or other custom data that the handler for the annotation object can interpret.

The outline object 118 provides an alternate way to navigate a document, providing a logical view that can be used to jump to a desired location of the document without viewing every page. The outline object is a hierarchical collection of nodes, each containing a reference to a bookmark object 116 and data specific to that outline instance. If desired, more than a single outline object can be provided for in a single document, wherein each outline object holds a unique type identifier.

A variation of an outline object that can be employed in the data structure includes a thumbnail list object that includes a hierarchical collection of nodes, each containing a reference to a thumbnail object including a graphics object representative of a thumbnail image of one page of the document. As such, the thumbnail list object provides a physical view of the pages of the document that can be used to navigate the document once rendered.

One or more list objects 104 can be provided in the data structure for providing a list of any number of navigation objects 116, 118 used in a document, and each includes a reference to the associated navigation objects by indicating the locations of the objects in the data structure. In turn, the document root object 98 includes a reference to the list object 104 so that any of the referenced navigation objects can be located via the document root object. List objects can be used with any other object type to provide a common reference to the objects that, in turn, can be referenced by the document root object 98. Generally, each list object is for a different object type, e.g., outline objects, document variable objects, or page list objects, and is provided when any number of such objects are to be listed together for reference via the document root object 98.

Figure 5:
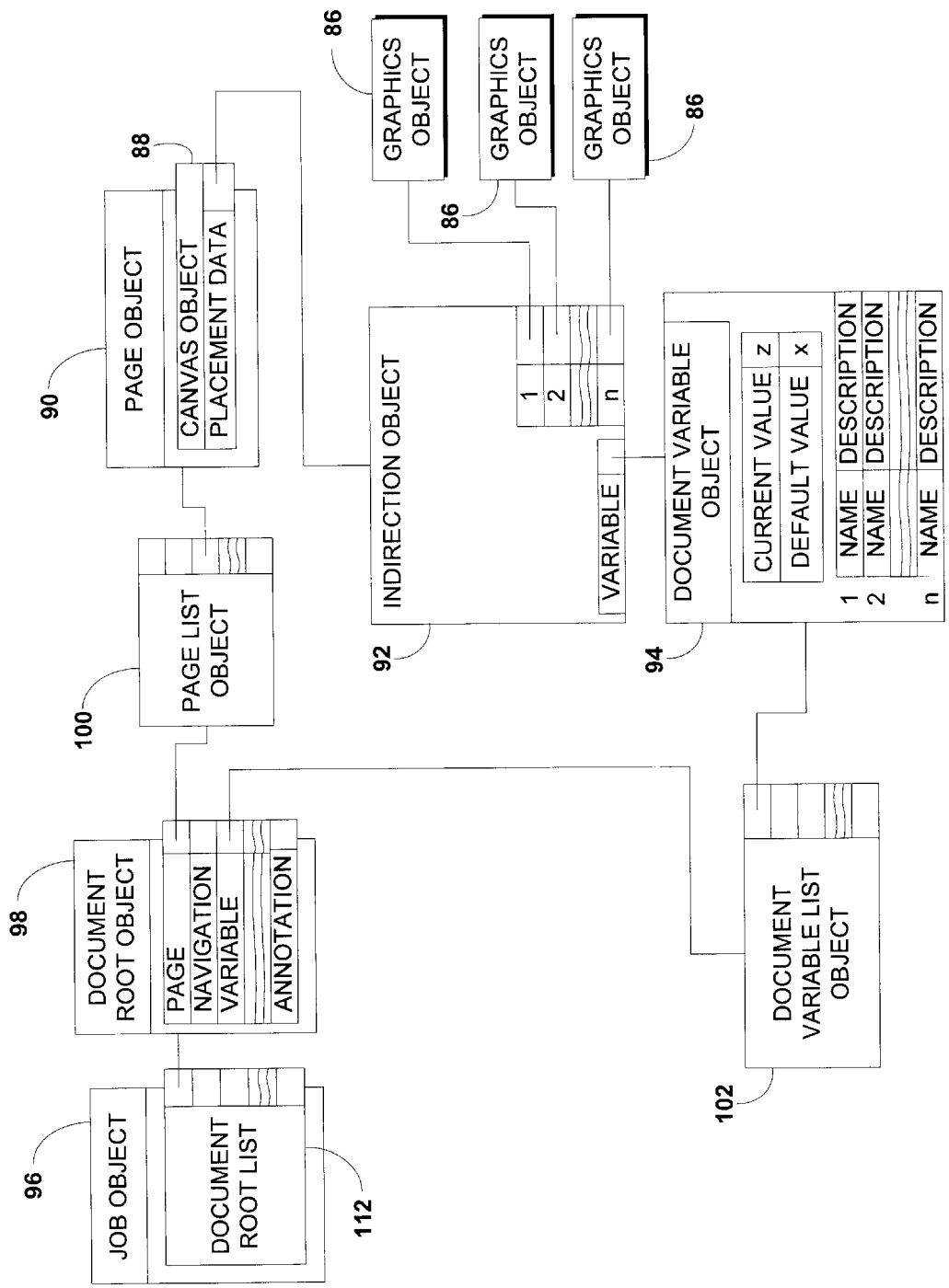
FIG. 5 is a block diagram of the data structure, illustrating various indirection objects forming a part thereof.

As illustrated in FIG. 5, a mechanism is provided in the data structure of the present invention for permitting the digital data to be rendered with any one of a plurality of different rendering layers. For example, a user's manual or other document could be stored in multiple languages as a plurality of rendering layers. A user wishing to render the manual could select which language was desired and view or print the document in that language. As such, only the selected language would be rendered, and the other non-selected languages would not, even though the graphics for those languages are stored in the data structure.

This multi-layered approach to representing the digital data as several alternately selectable graphics objects is preferably implemented through the use of an indirection object 92, a document variable object 94, and a referencing object, such as a page object 90 or a canvas objects 88. Preferably, the indirection object may be referenced by a variety of the objects within the data structure. For example, a job object document root list 112 may reference an indirection object to support multiple document object layers in the job. Likewise, a page list object may reference an indirection object to support multiple page object layers in a document. Accordingly, the location of the indirection object within the data structure dictates the amount co-existing layer objects that are required. Moreover, multiple indirection objects may be utilized in a job creating multiple object layers on the different levels of the job object.

As shown in FIG. 5, an indirection object 92 is being referenced by a canvas object 88 to support multiple layers of graphics objects within a canvas. As mentioned, a canvas object 88 references graphics objects 86 and the location of the graphics objects on a page. However, a canvas object can also reference other canvas objects, permitting a tree structure to be constructed, wherein canvas objects form the interior nodes and graphics objects form the leaves. Likewise, a canvas object can reference an indirection object 92 that includes a list of object references and a reference to a document variable object 94. Depending on the value of the document variable object at the time of rendering of the document, the indirection object determines which entry in the indirection object's list should be rendered.

The document variable object 94 includes a variable and rules describing how the variable may be set. As shown in the embodiment of FIG. 5, the document variable includes a name for the object, a list of strings, a default value for the object, preferably stored as a zero-relative index into the list of strings, and a current value that is also preferably an index into the list of strings. Each string includes a name and description for the graphics object represented by the string.

A document variable list object 102 is provided in the data structure for listing all of the document variable objects 94 in a document, and the document root object 98 references the document variable list object so that the document variable objects in the document can be located via the document root object.

In an exemplary implementation of the data structure, wherein a user's manual is stored in the English, German and Japanese languages, the indirection object can be described as follows:

Switch (Document Variable 33)
{
0: Object 40
1: Object 41
2: Object 42
}

The reference document variable object, having an ID of 33 in the example, contains the following data:
Name: "Select Language"
Default: 0
Current: 1
Values: "English", "German", "Japanese"

In this setting, the default setting is "English", but a user has modified it to be "German". When the indirection object is resolved, it will resolve to object 41, "German".

Although the indirection object described in the foregoing example and illustrated in FIG. 5 is a switch, preferably modeled after a C language switch statement, it is noted that other types of logic can be substituted therefor in order to provide a mechanism for resolving the indirection provided by the object 92. For example, any desired amount of logic can be built into or referenced by the indirection object that would enable a user to view different graphics objects, e.g., after a predetermined date, or based on the location or type of user attempting to view the document. As such, the indirection object is not limited to the logic provided by a switch, but can implement any functionality desired to set the variable value of the indirection object to select a desired one of a plurality of graphics objects for rendering.

Returning to FIG. 1, one of the objects illustrated as being included in the data structure of the present invention is an object index object 84, the location of which is referenced in the header 82 of the file incorporating the data structure. The object index object 84 maps object ID values to offsets within the file, with the object index object being the first entry. Therefore, the object index object has an object ID of zero.

The number of entries in the index is inferred from the size of the index object, and each object listed in the index can either be contiguous in the file or composed of multiple separated segments. When an object is contiguous, an indication of such is provided in the index object, and the offset and length of the referenced object is provided in the index object, preferably in "Offset" and "Length" fields defined by the index object. In addition, a flag or the like can be provided to indicate whether the referenced object is encoded.

In the event of an object being segmented, each segment of the object includes an entry in the index, and every segment except the last one points to the next segment of the referenced object, preferably by providing an offset to the beginning of the next segment in a "NextSegment" field provided in the index object. Likewise, the offset and length of the referenced segment is provided, along with a flag or the like that indicates whether the referenced object is encoded. By providing this construction, changes to one or more of the referenced objects, including the index object, can be made without rewriting the file or leaving a potentially large fragment of unused space with the file.

Figure 6:
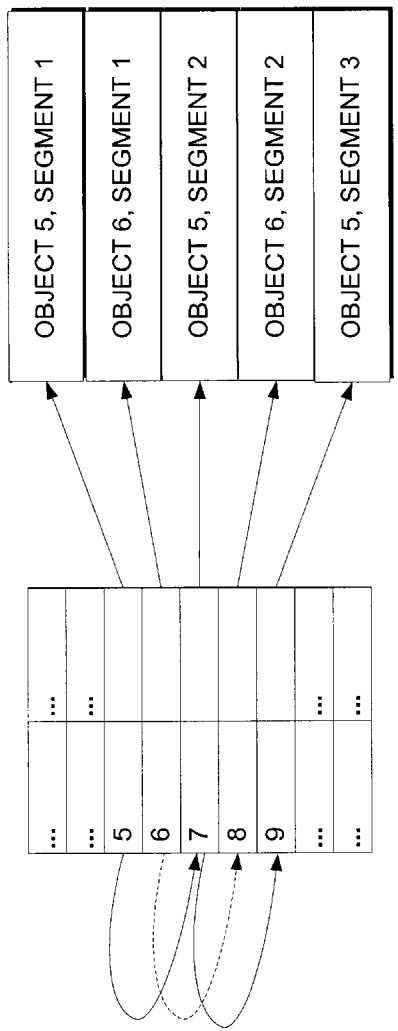
FIG. 6 is a block diagram of an index object forming a part of the data structure and of various objects referenced in the index object.

An example of an object index object 84 is provided in FIG. 6, wherein two objects, identified as objects 5 and 6, are segmented within a file incorporating the data structure of the present invention. As illustrated, the first segment of Object 5 includes an entry in the object index object, wherein the offset or location of the first segment in the file is provided along with an indication of the length thereof, e.g., 100 bytes. In addition, the index includes a pointer or reference to the offset of the starting point of the next segment of Object 5 in the object index object, which is indicated as 7 in the figure. The entry for the segment beginning at offset 7 includes the offset and an indication of the length thereof. In addition, an indication is provided as to whether the segment is encoded, and a pointer is provided to the offset of the starting point of the last segment of Object 5, indicated as being 9 in the figure. The entry for the last segment of Object 5 is the same as the other segments, except that there is no reference to a next segment. Instead, an indication is provided that the third segment is the last segment in the referenced object. Another object of the file, referenced first at offset 6 in the index, is also segmented. The segments of Object 6 each provide the same information as those described with reference to Object 5.

Because the object index object is itself segmentable, it is possible that an entry in the index object will need to span one or more segments of the index object. Because the index object is orthogonal to the data in the object, this occurrence is possible. By providing a construction in accordance with the present invention, numerous advantages are achieved. For example, by permitting objects to be segmented, less important bytes of the objects in a file can be placed at the end of the file, and an object can easily be appended to by appending the new bytes at the end of the file rather than requiring that the file be rearranged to keep the bytes of each object contiguous. As such, the data structure can be streamed more effectively than a conventional data structure that requires the use of objects or components that are contiguous in the file.

Another advantage achieved by the data structure of the present invention relates to the ability of a user to encode an object in the data structure using any conventional lossless type of encoding, or to combine plural objects for such encoding. When one or more objects are encoded, the individual objects are chained together. A new object is created to hold the chained objects, referred to as a "meta-object," and this meta-object is referred to by the "Next-Segment" field of the last segment in the individual objects. At the same time, the "Encoded" flag in the object index object is set for the individual objects to indicate that they are encoded, and the offset and length values are modified to be relative to the unencoded meta-object, rather than being relative to the encoded data.

A simplified exemplary pseudo-code path for creating a file in accordance with the present invention in a WINDOWS® operating program interface environment is shown below, wherein "XMF" stands for extended metafile format, a name used to identify an exemplary format incorporating the data structure of the present invention:

```
// Instantiate the XMF processor
CoCreateInstance( CLSID_XMFFile, NULL, CLSCTX_ALL,
    IID_IXMFJob, &pJob );
// Create a XMF file
pJob->QueryInterface( IID_IPersistFile, &pPersistFile );
pPersistFile->Load( Filename, STGM_CREATE );
pPersistFile->Release();
// Create a XMF document to be placed within the file
pJob->CreateAndAdd( XMFTYPE_DOCUMENT,
    IID_IXMFDocument, &pDocument, XMFLIST_ADD_END );
// Create a page to be placed within the document
pDocument->CreateAndAdd( XMFTYPE_PAGE, IID_IXMFPage,
    &pPage, XMFLIST_ADD_END );
// Create the graphics objects on the page, requesting that
// the exposed interface for the GDI graphics object to be a data
    stream.
pPage->CreateAndAdd( XMFTYPE_EMF, IID_IStream, &pGDIStream,
    XMFLIST_ADD_END );
// Call code that sends drawing commands into the stream.
GraphicsDrawingRoutine (pGDIStream);
// Close everything out
pGDIStream->Release ();
pPage->Release ();
pDocument->Release ();
pJob->Release ();
```

A document is typically stored in a file incorporating a data structure in accordance with the present invention to provide a static graphical representation of the document in a guaranteed layout so that others may view and print the document in its original form. The document can be used by others to view the document, to add annotations without effecting the existing file layout, or to print it to a printer.

Although some of the features described herein require the use of a viewer that is aware of the data structure and that is able to provide a user interface enabling the features, other aspects of the data structure are intended to have utility in any application that supports the graphics model used in creating the graphics objects that represent the document. For example, in a preferred embodiment of the invention in which GDI commands and resources or the like are used to create the graphics objects representing a document, the user's operating system can enable any GDI-aware application to view the document.

Although the invention has been described with reference to a preferred embodiment as illustrated in the attached drawing figures, it is noted that substitutions may be made and equivalents employed herein without departing from the scope of the invention as recited in the claims.

What is claimed is:

1. A method of storing a digital document including at least one page, the method comprising the steps of:
   representing each page with at least one graphics object;
   creating a page object for each page that includes a reference to the at least one graphics object for that page;
   creating a page list object including a list of references to the page objects for the document;
   creating a document root object that includes a reference to the page list object;
   creating an object index object that includes a reference to all of the objects created during performance of the method steps;
   dividing at least one of the objects into a plurality of segments, wherein each segment includes a reference to any next subsequent segment of the object, wherein the object index object includes a reference to each segment of the at least one segmented object and an indication of the length of each segment.

2. The method as recited in claim 1, wherein the object index object is segmented, and each segment of the object index object includes a reference to the next subsequent segment.

3. A method of storing a digital document including at least one page, the method comprising the steps of:
   representing each page with at least one graphics object;
   creating a page object for each page that includes a reference to the at least one graphics object for that page;
   creating at least one canvas object for each page that includes a list of the graphics objects and the coordinates on the page at which each graphics object is located, and wherein the page object includes a reference to the at least one canvas object;
   creating a page list object including a list of references to the page objects for the document;
   creating a document root object that includes a reference to the page list object; and
   storing each graphics object, each page object, each canvas object, the page list object, and the document root object together in a single data structure representing the digital document.

4. The method as recited in claim 3, wherein plural documents are stored in a job, the method further comprising the step of creating a job object that includes a reference to the document root objects for the job.

5. The method as recited in claim 3, wherein the method is carried out on a computing system having a graphical operating environment, and at least one of the graphics objects includes graphics elements selected from a library of graphics elements included in the graphics display system of an operating program interface of the computing system.

6. The method as recited in claim 3, further comprising the step of creating an object index object that includes a reference to all of the objects created during performance of the method steps.

7. The method as recited in claim 6, wherein the object index object includes a reference to each object created during performance of the method steps and an indication of the length of each object.

8. The method as recited in claim 3, further comprising the step of dividing at least one of the objects into a plurality of segments.

9. The method as recited in claim 3, wherein the graphics object includes at least one graphics device interface (GDI) command or resource.

10. The method as recited in claim 3, further comprising the step of creating a property set object including a property set associated with at least one of the other objects created during performance of the method steps, the object to which the property set is associated including a reference to the property set object.

11. The method as recited in claim 10, wherein the property set is stored in the object linking and embedding (OLE) property set serialization format.

12. The method as recited in claim 3, further comprising the step of creating a page name object including a name for each page of the document.

13. The method as recited in claim 3, further comprising the step of rendering an annotation on the digital document, the annotation rendering step including the steps of:

creating an annotation object that identifies the location in the document at which the annotation is to be rendered; and providing a reference to the annotation object in one of the page object or the graphics object with which the annotation is associated.

14. A computer-readable medium having stored thereon a data structure for storing a digital document having at least one page, the data structure comprising:

at least one graphics object representative of a portion of at least one of the pages;

a page object for each page of the document, each page object including a reference to the at least one graphics object for that page;

a document root object that includes a list of the page objects for the document;

a job object that includes a list of all the document root objects for the documents to be rendered by the data structure; and an object index object that identifies the location of each of the objects in the data structure, wherein at least one of the objects of the data structure is divided into a plurality of segments, and each segment includes a reference to any next subsequent segment of the object, and wherein the object index object of the data structure includes a reference to each segment of the at least one segmented object and an indication of the length of each segment.

15. A computer-readable medium having stored thereon a data structure for storing a digital document having at least one page, the data structure comprising:

at least one graphics object representative of a portion of at least one of the pages;

a page object for each page of the document, each page object including a reference to the at least one graphics object for that page;

at least one canvas object for each page, the canvas object including a list of graphics objects to be rendered on the page and the coordinates on the page at which each graphics object is located, and wherein the page object includes a reference to the at least one canvas object;

a document root object that includes a list of the page objects for the document;

a job object that includes a list of all the document root objects for the documents to be rendered by the data structure; and an object index object that identifies the location of each of the objects in the data structure.

16. The computer-readable medium as recited in claim 15, wherein the object index object of the data structure includes a reference to each object and an indication of the length of each object.

17. The computer-readable medium as recited in claim 15, wherein at least one of the objects of the data structure is divided into a plurality of segments.

18. The computer-readable medium as recited in claim 15, wherein the object index object of the data structure is segmented, and each segment of the object index object includes a reference to the next subsequent segment.

19. The computer-readable medium as recited in claim 18, wherein the property set is stored in the object linking and embedding (OLE) property set serialization format.

20. The computer-readable medium as recited in claim 15, wherein the graphics object of the data structure includes at least one graphics device interface (GDI) command or resource.

21. The computer-readable medium as recited in claim 15, wherein the data structure further comprises a property set object including a property set associated with at least one of the other objects of the data structure, the object to which the property set is associated including a reference to the property set object.

22. The computer-readable medium as recited in claim 15, wherein the data structure further comprises an annotation object that identifies the location in the document at which an annotation is to be rendered, and wherein the page object or graphics object with which the annotation object is associated includes a reference to the annotation property set object.

* * * * *